March 12, 1940.   J. S. HASBROUCK   2,193,332
RESILIENT ENGINE MOUNT
Filed April 21, 1937
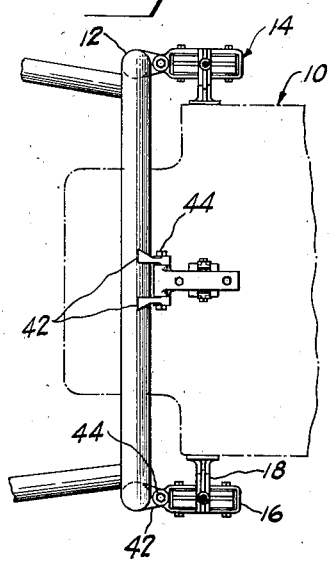
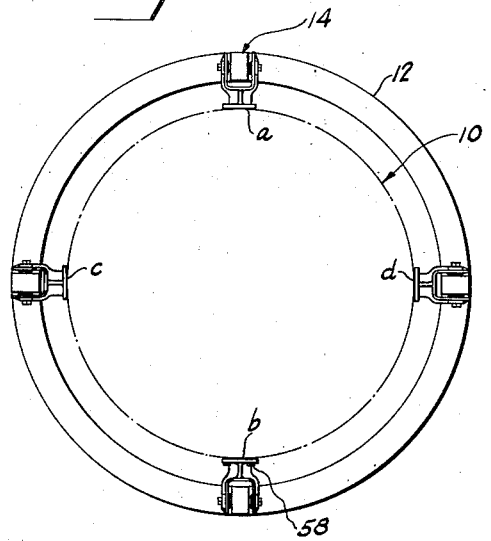
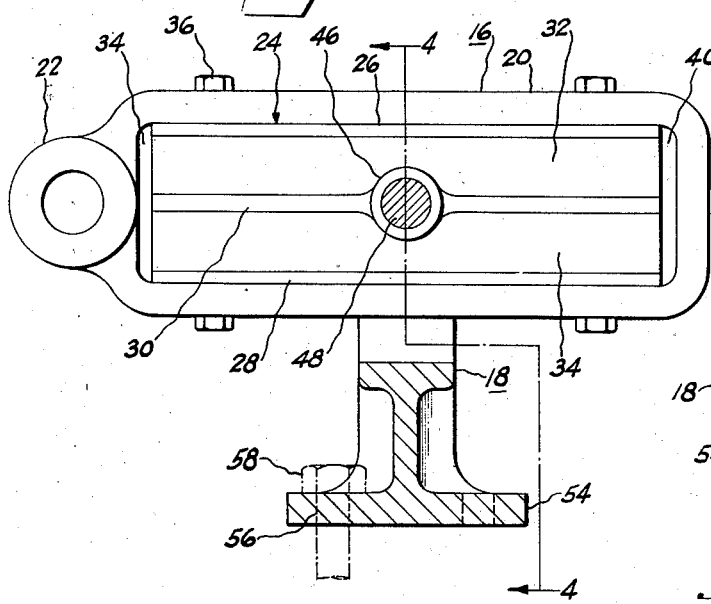
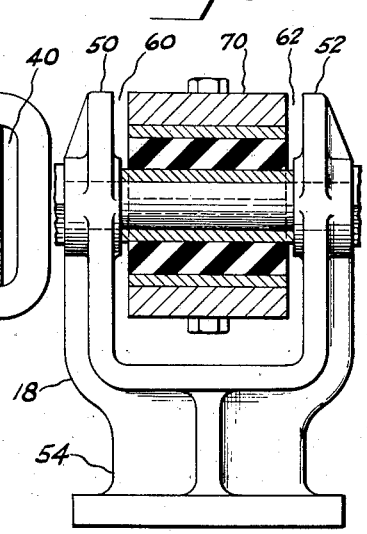
INVENTOR.
John S. Hasbrouck
BY Harris G. Luther
ATTORNEY Patented Mar. 12, 1940

2,193,332

UNITED STATES PATENT OFFICE 2,193,332

RESILIENT ENGINE MOUNT

John S. Hasbrouck, Manchester, Conn., assignor to United Aircraft Corporation, East Hartford, Conn., a corporation of Delaware Application April 21, 1937, Serial No. 138,208

15 Claims. (Cl. 248—5)

This invention relates to improvements in resilient mounting devices for securing a power plant to a supporting frame and has particular reference to a resilient mount for supporting an aircraft engine upon the engine supporting framework of the aircraft.

An object of the invention resides in the provision of an improved resilient engine mounting which will securely support the engine against forces incident to weight, torque, and thrust, and will, at the same time, substantially eliminate the transmission of vibration from the engine to the engine supporting frame.

A further object resides in the provision of an improved resilient engine mount of the character specified having pads of resilient material disposed between complementary bracket elements attached to the engine and to the engine supporting frame and so arranged that all of the forces transmitted between the engine and the supporting frame are carried through the resilient pads in shear in the material of the pads.

Other objects and advantages will be more particularly pointed out hereinafter or will become apparent as the description proceeds.

In the accompanying drawing in which like reference numerals are used to designate similar parts throughout there is illustrated a suitable mechanical embodiment of what is now considered to be the preferred form of the idea of the invention. The drawing however, is for the purpose of illustration only and is not to be taken as limiting the invention the scope of which is to be measured entirely by the scope of the appended claims.

In the drawing Fig. 1 is a partly schematic elevational view of a fragmentary portion of an engine supporting frame and an engine supported thereon by a resilient mount constructed according to the idea of the invention.

Fig. 2 is a front elevational view of an engine mounting ring showing resilient engine supports, constructed according to the idea of the invention, extending from the mounting ring to the engine, schematically indicated by the circle enclosing the engine mounting pads. Fig. 3 is a side elevational view of a resilient engine mount constructed according to the idea of the invention a portion being broken away and shown in sections to better illustrate the construction thereof, and, Fig. 4 is a transverse sectional view of the improved engine mount taken on the line 4—4 of Fig. 3.

Referring to the drawing in detail the engine, generally indicated at 10, is supported upon the ring 12 by a plurality of mounting units, generally indicated at 14. These units are angularly spaced around the mounting ring and each has one element connected with the mounting ring and a cooperating element connected with the engine. While the drawing illustrates an installation in which four mounting units are utilized and, while four such units, disposed at angles of approximately 90 degrees to each other is believed to be the most effective arrangement for taking advantage of the features of the improved resilient mount, it is to be understood that any number of units 14 may be utilized as may be necessary or desirable.

Each of the resilient mounting units 14 is so constructed and arranged that, when assembled with the engine and the engine mounting ring in the relation indicated in Figs. 1 and 2, in which the engine axis which coincides with the crankshaft or propeller axis passes through approximately the center of the mounting ring, a limited freedom of movement of the engine in all directions relative to the mounting ring is permitted, such movement being at all times resisted by the resilient material acting in shear, and movements beyond the limited movement for which the mounting is designed are positively resisted by contact of the metal parts of the mounting unit. The units are also designed to oppose the forces tending to move the engine with respect to the mounting ring with a resistance proportional to the forces so that the resiliency of the mounting will be retained in the direction of the greater forces, such as the thrust force developed by the engine and the propeller, as well as in the direction of forces imposed by the weight of the engine and the torsional vibrations of the engine during operation.

While a plurality of units are necessary for a complete installation, since the units are all similar in construction, it is believed that a detailed description of a single unit will be adequate for the purpose of this disclosure.

Each resilient mounting unit 14 comprises two portions or bracket members pivotally secured together, one member being pivotally connected to the mounting ring and the other member being rigidly connected to the respective engine mounting pads. In the constructional form of the device illustrated, the member 16 is shown as pivotally connected to the engine mounting ring 12 and pivotally connected to the member 18 which is rigidly connected to an engine mounting pad.

The portion 16 comprises a substantially rectangular elongated metallic loop 20 provided at one end with an integral apertured lug 22, and a loop included resilient matrix generally indicated at 24. The resilient element comprises a pair of side plates 26 and 28, an intermediate plate 30, a resilient pad 32 between the plate 26 and the adjacent side of the intermediate plate 30, and a similar resilient pad 34 between the side plate 38 and the adjacent side of the intermediate plate 30. The resilient element 24 is secured in the respective bracket loop 20 by suitable means, such as the cap screws 36 which extend through apertures in the bracket and are screw-threaded into the adjoining side plates 26 and 28, and terminates at each end short of the adjacent end of the loop bracket to provide spaces, as indicated at 38 and 40, to permit a limited freedom of movement of the intermediate plate 30 in a longitudinal direction relative to the bracket 20, resisted by the stiffness of the resilient pads 32 and 34 acting in shear. In the construction illustrated, the apertured lug 22 is received between a pair of apertured hangers 42, rigidly secured to the mounting ring 12, and is pivotally secured to the hangers by suitable means such as the through pin, or bolt 44, in such a manner that the bracket member 26 may swing about the axis of the pivotal connection between the lug 22 and the hangers 42 but is restrained against the movement in any other direction. The resilient element or matrix, 34, is so proportioned that it has its greatest dimension in the direction of the force of greatest magnitude developed by the engine in operation.

The intermediate plate 30 is provided substantially central thereof with a transversally apertured enlarged portion 46 through which extends the pin 48 that pivotally secures the member 16 to the member 18.

The bracket member 18 of the mounting unit comprises a forked or loop shaped bracket having oppositely disposed sides or arms 50 and 52 provided with apertured bosses for receiving the respective ends of the through pin 48, and integrally joined to a base portion 54 which is provided with apertures 56 through which suitable means, such as the cap screws 58, may extend to secure the member 18 rigidly to the engine mounting pad. The width of the member 20 and the spacing of the sides or arms 50 and 52 are so proportioned that spaces, as indicated at 60 and 62, are provided between the respective sides 50 and 52 and the adjacent sides of the bracket member 20 to provide for a limited freedom of movement of the member 16 relative to the member 18 in a direction longitudinal of the through pin 48.

The resilient pads 32 and 34 are preferably formed of rubber of a selected consistency and spring rate and are vulcanized to the respective side plates 26 and 28 and the intermediate plate 30 to constitute the resilient element 24 a substantially integral structure.

From the above description it will be observed that the member 18 of the mounting unit may move relative to the portion 16 in directions both longitudinally and transversally of the through pin 48, against the resistance of the resilient pads 32 and 34, and may pivot freely with respect to the member 16 about the axis of the through pin 48. It will also be observed that the member 16 may pivot freely with respect to the mounting ring 12 about the axis of the through pin 44.

With the construction of the units as described above, when they are associated with an engine and mounting ring, as indicated in Figs. 1 and 2, the upper and lower units, as indicated at $a$ and $b$, carry none of load of the weight of the engine the entire engine weight being carried by the side units $c$ and $d$ and being transmitted to the mounting ring 12 through shear stresses in the resilient pads 32 and 34 of the units $c$ and $d$ in a direction longitudinal of the through pins 48. Torsional forces between the engine and the mounting ring are carried by all of the units, and such forces are carried in shear by the resilient pads 32 and 34 to the extent of the width of the spaces 60 and 62. If for any reason, the forces exceed the resistance of the resilient pads in shear, or the pads lose their resistance, the member 18 of the respective mounting unit will move relative to the corresponding member 16 until the respective sides or arms 50 and 52 come in contact with the adjacent side of the respective member 16, at which time the mounting unit will positively restrain the engine against further movement in a rotational direction relative to the mounting ring. Propeller thrust forces between the engine and the mounting ring are carried by all of the mounting units through the resilient pads in shear in a direction transverse to the axes of the through pins 48 to the extent of the width of the spaces 38 and 40. If such forces exceed the resistance of the resilient pads, or the pads for any reason lose their resistance, the member 18 of any mounting unit may move relative to the member 16 in a direction transverse to the axis of the through pin until the respective end of the intermediate plate 30 comes in contact with the inner surface of the corresponding end of the respective loop bracket 18 at which time the engine will be positively restrained against further movement in a longitudinal direction relative to the mounting ring 12.

From the above description it will be observed that there has been provided an improved resilient engine mount which permits resiliently resisted movements of the engine in all directions to a limited extent with respect to the engine mounting ring and which positively restrains the engine against further movement when the selected limits of resiliency are reached or when there is a failure of resilient opposition to movement.

While there has been illustrated and described a suitable mechanical embodiment of what is now considered to be the preferred form of the idea of the invention, it is to be understood that the invention is not limited to the constructional form so illustrated and described but that such changes in the size, shape and arrangement of parts may be resorted to as come within the scope of the subjoined claims.

Having now described the invention so that others skilled in the art may clearly understand the same what it is desired to secure by Letters Patent is as follows:

1. A resilient engine mount for supporting an engine on an engine support comprising, a member for attachment to said engine, a loop shaped bracket member of substantially rectangular form adapted to be pivotally attached to said support, a plate within said loop, a pivotal connection between said plate and said first-mentioned member, and a resilient matrix in said loop shaped bracket member surrounding said plate and said pivotal connection.

2. A resilient engine mount for supporting an engine on an engine support comprising, a member for attachment to said engine, a loop shaped bracket member of substantially rectangular form having relatively long side portions and relatively short end portions for pivotal attachment to said support, a pivotal connection between said members having its axis parallel to said pivotal attachment, and a resilient matrix in said loop shaped bracket member surrounding said pivotal connection.

3. A resilient engine mount for supporting an engine on an engine support comprising, a bracket member having a pair of opposed sides and a base portion for attachment to said engine, a loop shaped bracket member for a pivotal attachment to said support received between the opposed sides of said first mentioned bracket member, a plate within said loop-shaped bracket member, a pivotal connection between said sides and said plate having its axis parallel to the axis of the pivotal attachment between said bracket member and said support, and a resilient matrix in said loop shaped bracket member surrounding and supporting said plate.

4. A resilient engine mount for supporting an engine on an engine support comprising, a bracket member having a base portion for attachment to said engine and a pair of opposed side portions, a loop bracket member for pivotal attachment to said support received between said side portions, a pivotal connection between said first mentioned bracket and said loop bracket, and a matrix of resilient material within said loop bracket surrounding said pivotal connection, said side portions of said first-mentioned bracket being spaced from the adjacent surfaces of said loop bracket to provide a limited freedom of resiliently resisted movement between said two bracket members along said pivotal connection.

5. A resilient engine mount for supporting an engine on an engine support comprising, a bracket member having opposed arms for attachment to said engine, a loop shaped bracket member received between said arms and provided at one end with an apertured lug for pivotal attachment to said support, a center plate in said loop shaped bracket member, a pivotal connection between said center plate and the opposed arms of said first mentioned bracket member, and a resilient pad between each side of said center plate and the adjacent surfaces of said loop shaped bracket member.

6. A resilient engine mount for supporting an engine on an engine support comprising, a U-shaped bracket member having a pair of opposed arms for attachment to said engine, a loop shaped bracket member of substantially rectangular shape having relatively long side portions and relatively short end portions and an apertured lug at one end portion for pivotal attachment to said support received between the opposed arm of said U-shaped bracket member, a center plate in said loop shaped bracket member extending between the relatively long side portion thereof, a pivotal connection between said center plate and the opposed arms of said U-shaped bracket, and a resilient pad between each side of said center plate and the adjacent side portion of said loop shaped bracket member.

7. A resilient engine mount for supporting an engine on an engine support comprising, a U-shaped bracket member having a pair of opposed arms for attachment to an engine, a loop shaped bracket member of substantially rectangular form having relatively long side portions and relatively short end portions and an apertured lug portion at one end for pivotal attachment to said support received between the opposed arms of said U-shaped bracket member, a center plate in said loop shaped bracket member extending lengthwise thereof and having its ends spaced from the corresponding ends of said loop shaped bracket member to provide a limited freedom of relative movement between said center plate and said bracket member, a pivotal connection between said center plate and the opposed arms of said U-shaped bracket member, and a resilient pad between each side of said center plate and the adjacent side of said loop shaped bracket member.

8. A resilient engine mount for supporting an engine on an engine support comprising, a bracket member having a pair of opposed sides for attachment to said engine, a loop shaped bracket member of substantially rectangular shape having relatively long side portions and relatively short end portions and an apertured lug at one end for pivotal attachment to said support received between the opposed sides of said first mentioned bracket member, a center plate in said loop shaped bracket member having its ends spaced from the corresponding ends of the looped bracket member and pivotally connected to the opposed sides of said first mentioned bracket member, a side plate secured to each side of said loop shaped bracket member facing the adjacent surface of said center plate, and a rubber pad between each side plate and the adjacent surface of said center plate, said pad being vulcanized to said center plate and the respective side plates.

9. A resilient engine mount for supporting an engine on an engine support comprising, a U-shaped bracket member having a pair of opposed arms and a base portion for attachment to said engine, a loop shaped bracket member having relatively long side portions and relatively short end portions and an apertured lug at one end for pivotal attachment to said support received between said opposed arms and spaced therefrom to provide a limited freedom of movement in a lateral direction between said bracket members, a center plate having a centrally located transverse aperture disposed lengthwise in said loop shaped bracket member and pivotally connected to the opposed arms of said U-shaped bracket member by a pin extending through said aperture, said center plate having its ends spaced from the corresponding ends of said loop shaped bracket member to provide a limited freedom of relative movement in a longitudinal direction between said bracket members, and a resilient pad between each side of said center plate and the adjacent side of said loop shaped bracket member to resiliently resist relative movement between said bracket members by shear stresses in said pads.

10. A resilient engine mount for supporting an engine on an engine support comprising, a U-shaped bracket member having a pair of opposed arms and a base portion for attachment to said engine, a loop shaped bracket member of rectangular form having an apertured lug for a pivotal attachment to said support received between said opposed arms, a center plate disposed in said loop shaped bracket member secured therein by resilient pads between the center plate and the adjacent sides of the loop shaped bracket member, and a pivotal connection between said opposed arms and said center plate, said arms being spaced from said loop shaped bracket member and said center plate being spaced at its ends from the corresponding ends of the loop shaped bracket member to provide a limited freedom of movement between said loop shaped member and said U-shaped bracket member, said resilient pads being secured to said center plate and said loop shaped bracket member to resist such relative movement by shear stresses in the material of the pad.

11. Means for resiliently supporting an engine on an engine mounting ring comprising a plurality of mounting brackets each including a loop member adapted to be pivotally connected to said ring, a loop receiving member adapted to be rigidly secured to the engine, an intermediate member in said loop member, a pivotal connection between said loop receiving member and said intermediate member having its axis parallel to the axis of said pivotal connection between said loop member and said ring, and resilient material between said intermediate member and the adjacent surfaces of said loop member having substantially equal areas in contact with said loop member and said intermediate member.

12. Means for resiliently supporting an engine on an engine mounting ring comprising a plurality of mounting brackets each including a loop member adapted to be pivotally connected to said ring, a loop receiving member adapted to be rigidly secured to the engine, a flat surface intermediate member in said loop member, a pivotal connection between said loop receiving member and said intermediate member having its axis parallel to the axis of said pivotal connection between said loop member and said ring, and resilient material between said intermediate member and the adjacent surfaces of said loop member having substantially equal areas in contact with said loop member and said intermediate member, said brackets being so disposed about said ring that the axes of the pivotal connections of adjacent brackets are angularly disposed with respect to each other.

13. Means for resiliently connecting a supported body to a supporting body comprising a plurality of spaced apart annularly disposed mounting brackets each including a link substantially parallel to the perpendicular axis of said annulus, a pair of parallel link carried hinge joints having their axes disposed tangentially of said annulus, a plate carrying one of said hinge joints having its surfaces substantially parallel to adjacent surfaces of said link, and resilient material between said plate and said link having substantially equal areas in contact with said plate and said link distortable in shear by movements of said hinge joint with respect to said link in the plane including the axes of said hinge joints.

14. Means for resiliently supporting an engine on an engine supporting ring comprising, a plurality of resilient mounting brackets angularly spaced about said ring, each bracket including a ring connected element and an engine connected element separated by a resilient unit comprising a substantially flat pad of resilient material, a pivotal connection having an axis located substantially in the plane of said pad, substantially parallel to the plane of said ring and normal to a radius of said ring and connecting the ring connected element of said bracket to said ring, and a pivot having an axis substantially parallel to and spaced from said first mentioned axis in a direction generally normal to the plane of said ring and located substantially in the plane of said pad and connecting the engine connected element of said bracket to said engine so that forces acting between said engine and said ring perpendicular to or circumferentially of said ring are transmitted by all of said brackets through shear in said resilient material.

15. Means for resiliently supporting, on an engine support, an engine having an axis about which torsional forces are resisted and parallel to which thrust forces are resisted, comprising a plurality of resilient mounting brackets angularly spaced about said axis, each bracket including a support connected element and an engine connected element separated by a resilient unit comprising a substantially flat pad of resilient material, a pivotal connection connecting the support connected element of said bracket to said support and having an axis located substantially in the plane of said pads, and normal to a plane passing through said pad and including said axis, a pivot having an axis substantially parallel to and spaced from said pivotal connection axis in a direction generally parallel to said engine axis and located substantially in the plane of said pad and connecting the engine connected element of said bracket to said engine so that force components acting parallel to or around said engine axis are transmitted through said pads of resilient material in shear, said pads being elongated in the direction of said engine axis so that greater resistance is offered to forces acting parallel to said engine axis than to forces acting around said axis.

JOHN S. HASBROUCK.